United States Patent
Meusburger et al.

(10) Patent No.: US 11,304,522 B2
(45) Date of Patent: Apr. 19, 2022

(54) DRAWER PULL-OUT GUIDE

(71) Applicant: Julius Blum GmbH, Hoechst (AT)

(72) Inventors: Marc Meusburger, Egg (AT); Elvis Music, Lindau (DE); Emanuel Netzer, Hoechst (AT); Ingo Gasser, Hoechst (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 16/800,492

(22) Filed: Feb. 25, 2020

(65) Prior Publication Data
US 2020/0187648 A1     Jun. 18, 2020

Related U.S. Application Data

(63) Continuation of application No. PCT/AT2018/060152, filed on Jul. 18, 2018.

(30) Foreign Application Priority Data

Aug. 30, 2017    (AT) .............................. A 50723/2017

(51) Int. Cl.
*A47B 88/487*    (2017.01)
*A47B 88/437*    (2017.01)
*A47B 88/43*     (2017.01)

(52) U.S. Cl.
CPC .......... *A47B 88/487* (2017.01); *A47B 88/437* (2017.01); *A47B 88/43* (2017.01)

(58) Field of Classification Search
CPC ....... A47B 88/467; A47B 88/49; A47B 88/50; A47B 88/477; A47B 88/427; A47B 88/40;
(Continued)

(56) References Cited

U.S. PATENT DOCUMENTS

| 4,351,575 A | 9/1982 | Röck et al. |
| 4,445,726 A | 5/1984 | Röck et al. |

(Continued)

FOREIGN PATENT DOCUMENTS

| CN | 105725546 | 7/2016 |
| CN | 105792705 | 7/2016 |

(Continued)

OTHER PUBLICATIONS

International Search Report dated Sep. 20, 2018 in International (PCT) Patent Application No. PCT/AT2018/060152, with English Translation.

(Continued)

*Primary Examiner* — Hanh V Tran
(74) *Attorney, Agent, or Firm* — Wenderoth, Lind & Ponack, L.L.P.

(57) ABSTRACT

A drawer pull-out guide includes a first guide rail, a second guide rail displaceably supported relative to the first guide rail, and a running carriage which is displaceably supported between the first guide rail and the second guide rail. The running carriage includes at least three rolling bodies, each having a cylindrical form and being rotatable about a horizontally extending axis in a mounted position of the drawer pull-out guide. The at least three rolling bodies, in the mounted position of the drawer pull-out guide, are arranged in at least three running planes lying above one another.

18 Claims, 5 Drawing Sheets

(58) Field of Classification Search
CPC ..... A47B 88/487; A47B 88/437; A47B 88/43; A47B 2210/004; A47B 2210/0056; A47B 88/493; F16C 2314/72; F16C 29/045; F16C 29/048; F16C 29/008
See application file for complete search history.

(56) References Cited

U.S. PATENT DOCUMENTS

| | | | | |
|---|---|---|---|---|
| 5,882,100 | A * | 3/1999 | Rock | A47B 88/493 312/334.34 |
| 6,340,078 | B1 * | 1/2002 | Scheible | E05F 5/12 188/166 |
| 6,682,160 | B2 * | 1/2004 | Kung | A47B 88/493 312/334.12 |
| 6,932,200 | B2 | 8/2005 | Booker et al. | |
| 7,320,508 | B2 * | 1/2008 | Booker | F16F 9/0218 312/334.46 |
| 7,399,041 | B2 * | 7/2008 | Prentner | E05F 1/16 312/333 |
| 7,549,712 | B2 | 6/2009 | Booker et al. | |
| 7,845,744 | B2 * | 12/2010 | Chen | A47B 88/40 312/334.6 |
| 8,277,003 | B2 * | 10/2012 | Milligan | A47B 88/493 312/334.6 |
| 9,642,462 | B2 | 5/2017 | Violand | |
| 9,784,314 | B2 * | 10/2017 | Ng | F16C 29/04 |
| 9,894,992 | B2 | 2/2018 | Berchtold et al. | |
| 9,993,077 | B2 | 6/2018 | Chen et al. | |
| 10,362,869 | B2 * | 7/2019 | Gasser | A47B 88/41 |
| 2003/0197452 | A1 * | 10/2003 | Kung | A47B 88/493 312/334.6 |
| 2004/0000850 | A1 * | 1/2004 | Lam Harn | A47B 88/467 312/333 |
| 2004/0000851 | A1 * | 1/2004 | Lam Harn | A47B 88/493 312/334.7 |
| 2004/0227280 | A1 | 11/2004 | Booker et al. | |
| 2004/0227440 | A1 | 11/2004 | Booker et al. | |
| 2004/0227444 | A1 | 11/2004 | Booker et al. | |
| 2006/0214548 | A1 * | 9/2006 | Lam | A47B 88/427 312/332 |
| 2007/0080616 | A1 * | 4/2007 | Lam | A47B 88/49 312/334.6 |
| 2007/0080617 | A1 * | 4/2007 | Lam | A47B 88/493 312/334.15 |
| 2008/0157643 | A1 * | 7/2008 | Chen | A47B 88/47 312/334.6 |
| 2008/0284299 | A1 | 11/2008 | Chen et al. | |
| 2016/0242545 | A1 | 8/2016 | Violand | |
| 2016/0316911 | A1 * | 11/2016 | Berchtold | F16C 29/048 |
| 2017/0135482 | A1 * | 5/2017 | Chen | F16C 29/045 |
| 2018/0271274 | A1 | 9/2018 | Gasser et al. | |

FOREIGN PATENT DOCUMENTS

| | | |
|---|---|---|
| DE | 3127701 | 2/1983 |
| DE | 4337485 | 6/1994 |
| DE | 29619413 | 1/1997 |
| DE | 203 07 757 | 7/2003 |
| JP | 2017-503592 | 2/2017 |
| JP | 2019-503754 | 2/2019 |
| TW | 365679 | 10/2009 |
| TW | 201300048 | 1/2013 |
| WO | 2007/108601 | 9/2007 |
| WO | 2015/109345 | 7/2015 |
| WO | 2017/106889 | 6/2017 |

OTHER PUBLICATIONS

Office Action dated Jan. 18, 2021 in Chinese Patent Application No. 201880056668.4.

* cited by examiner

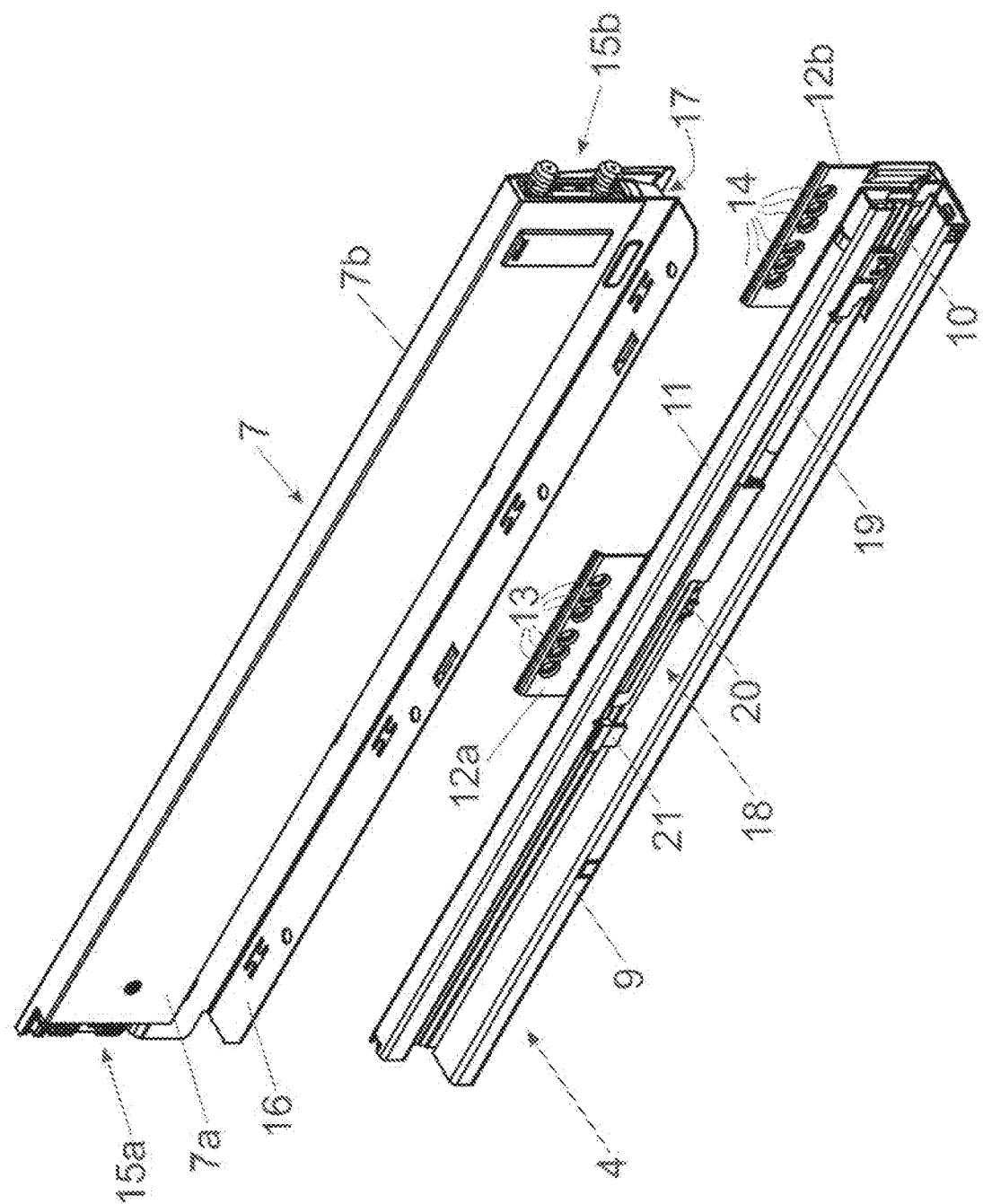

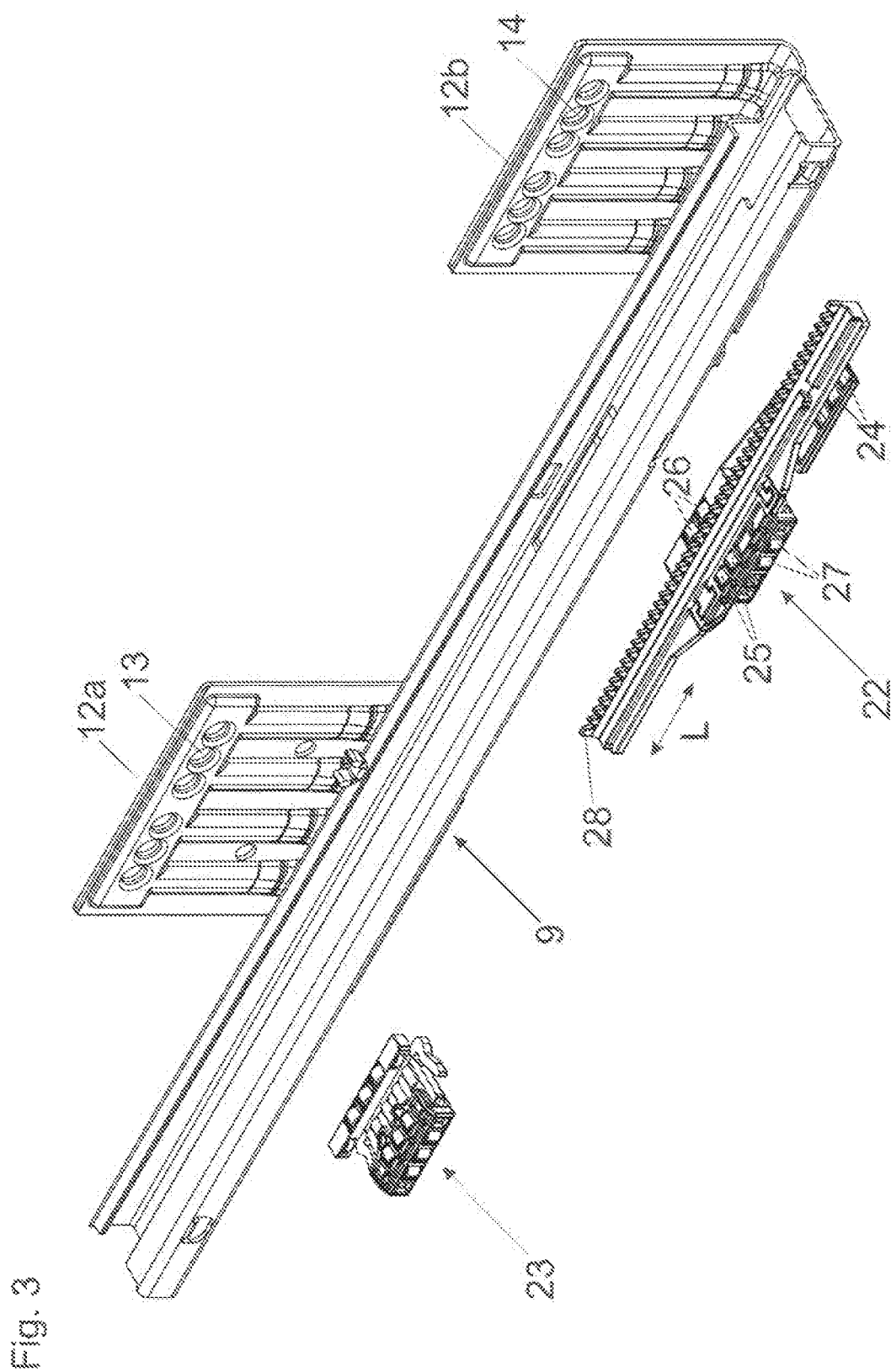

DRAWER PULL-OUT GUIDE

BACKGROUND OF THE INVENTION

The present invention relates to a drawer pull-out guide including a first guide rail, at least one second guide rail displaceably supported relative to one another, and a running carriage having load-transmitting rolling bodies and being displaceably arranged between the first guide rail and the second guide rail. The running carriage includes at least three rolling bodies, each of the at least three rolling bodies has a cylindrical form and is rotatable about a horizontally extending axis in a mounted position of the drawer pull-out guide.

With drawer pull-out guides, running carriages are utilized for transmitting a load of the drawer, and the running carriage enables a low-frictional and precise translation of the guide rails to one another. These running carriages (or cages of running carriages) include rolling bodies (for example in the form of cylinders, balls or cones) configured to run along running limbs provided on the guide rails, so that the guide rails can be glidingly supported relative to one another.

WO 2007/108601 A1 and DE 31 27 701 A1 disclose non-generic drawer pull-out guides, in which the load-transmitting rolling bodies are configured as balls which are arranged in a common running carriage. These ball guides have the drawback that the useable width of the balls, due to their spherical surface, is only used to an extent of approximately 70%, i.e. approximately 30% of a width of the balls waste constructional space and increase the weight. Moreover, the contact surface of the balls to the guide rails is only configured so as to be "punctiform", and that point contact—besides a small supporting surface—also leads to a high surface pressure and, therefore, to undesired deformations of the balls.

DE 296 19 413 U1 and DE 43 37 485 A1 disclose extension guides for drawers, in which cylindrical running rollers having a horizontal rotational axis are arranged in two running planes lying above one another. In addition thereto, lateral compensation rollers with a vertical rotational axis are provided for guiding the extension rail relative to the carcass rail in a lateral direction. The load-transmitting running rollers and the lateral compensation rollers are supported in a common running carriage.

WO 2017/106889 A1 discloses a drawer pull-out guide having a carcass rail, a central rail and a drawer rail, and running carriages with load-transmitting rolling bodies are displaceably arranged between each of these rails.

SUMMARY OF THE INVENTION

It is an object of the present invention to propose a drawer pull-out guide of the type mentioned in the introductory part, having a stable and compact construction of the running carriage.

According to the invention, the at least three rolling bodies of the running carriage, in the mounted position of the drawer pull-out guide, are arranged in at least three running planes lying above one another.

Accordingly, the running carriage includes at least three rolling bodies or at least three groups of rolling bodies, and the rotational axes of which are each arranged in running planes separate from one another and, in the mounted position of the drawer pull-out guide on a furniture carcass, are spaced from one another in a height direction.

This is, in view of the previously mentioned WO 2007/108601 A1 and DE 31 27 701 A1, not an obvious measure, because the drawer pull-out guides and running carriages shown in these references would have to be considerably modified for the use with cylindrical rollers having horizontally extending rotational axes.

Besides a stable and compact construction, the danger of deformations of the rolling bodies can be reduced, because the occurring forces can be distributed over a larger area due to the arrangement of the at least three rolling bodies lying in different running planes. As a result, each single rolling body is subjected to a reduced load. A further advantage of the invention lies in the fact that—in particular with restricted space conditions within a rail profile of the guide rails, for example due to a bent rabbet of a guide rail, a stable interconnection of a rolling body lying in one running plane with the other rolling bodies lying in other running planes can be brought about.

According to an embodiment, the at least three rolling bodies—in a view onto a plane extending perpendicular to a longitudinal extension of the guide rails—can be arranged so as to be laterally offset to one another. By virtue of such a three-point support, it is possible that lateral tilting moments, which are exerted due to a load of the drawer onto the guide rails, can be transmitted via the rolling bodies which are laterally arranged offset to one another and can therefore be absorbed in an improved manner.

With possible embodiments of the invention:
  a first rolling body of the at least three rolling bodies—in a view onto a plane extending perpendicular to a longitudinal direction of the guide rails—adopt a lowest position relative to a second rolling body and to a third rolling body, and the second rolling body and the third rolling body are entirely arranged above the first rolling body, and/or
  at least two of the at least three rolling bodies—in a view onto a plane extending perpendicular to a longitudinal direction of the guide rails—are only partially arranged above one another, and/or
  the at least three rolling bodies are spaced from each other along a direction extending in a longitudinal direction of the guide rails.

BRIEF DESCRIPTION OF THE DRAWINGS

Further details and advantages of the present invention will be explained with the aid of the following description of figures, in which:

FIG. 2 shows a drawer pull-out guide which is to be connected to a drawer sidewall, FIG. 3 is a perspective view of the first guide rail to be fixed to the furniture carcass together with two running carriages separate from one another.

DETAILED DESCRIPTION OF THE INVENTION

Figure 1:
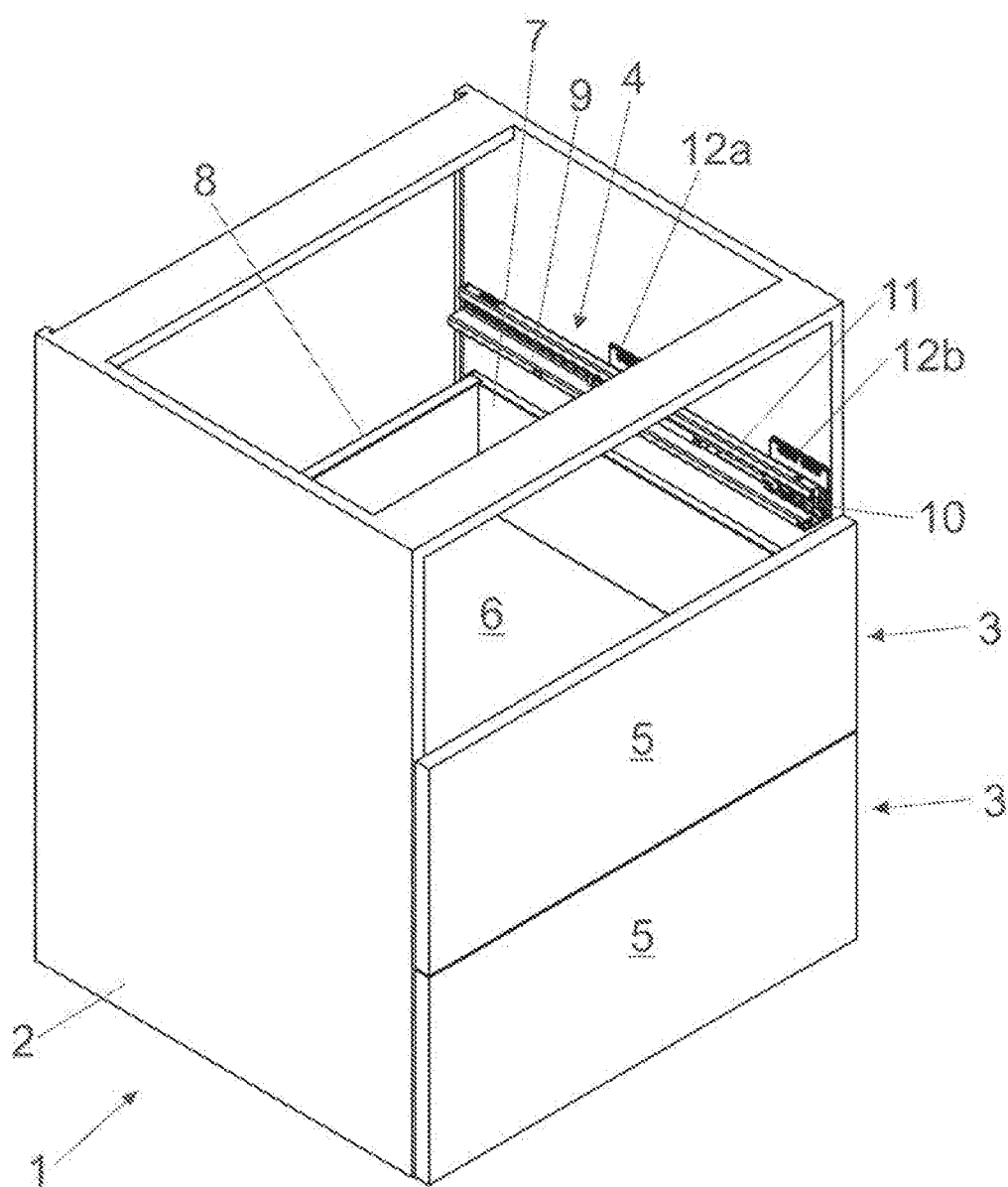
FIG. 1 is a perspective view of an item of furniture having drawers being displaceably supported relative to a furniture carcass by drawer pull-out guides.

FIG. 1 shows an item of furniture 1 having a cupboard-shaped furniture carcass 2, and drawers 3 are displaceably supported relative to the furniture carcass 2 by drawer pull-out guides 4. Each of the drawers 3 includes a front panel 5, a drawer bottom 6, drawer sidewalls 7 and a rear wall 8. Each of the drawer pull-out guides 4 includes a first guide rail 9 configured to be fixed to the furniture carcass 2 by fastening sections 12a, 12b, and at least one second guide rail 10 configured to be displaceable relative to the first guide rail 9. In the shown embodiment, a third guide rail 11 to be fixed to the drawer 3 is further provided, and the second guide rail 10 in the function of a central rail for increasing an extension of the drawer 3 is displaceable between the stationary first guide rail 9 and the third guide rail 11.

FIG. 2 shows an arrangement with a drawer pull-out guide 4 and a drawer sidewall 7 in a perspective view. Each of the fastening sections 12a, 12b of the first guide rail 9 includes one or a plurality of fastening locations 13, 14 for fixing to the furniture carcass 2. The third guide rail 11 is connected or is configured to be releasably connected to the drawer sidewall 7, and the second guide rail 10 is displaceable between the first guide rail 9 and the third guide rail 11. A coupling element 21 is arranged on the third guide rail 9, the coupling element 21 being configured to be releasably coupled to an entrainment member 20 of a retraction device 18. Therefore, the third guide rail 11, at the end of the closing movement, can be engaged by the entrainment member 20 and can be retracted into a closed end position by a force storage member of the retraction device 18. By a damping device 19, preferably having a hydraulic piston-cylinder-unit, this spring-assisted retraction movement of the third guide rail 11 can be dampened until reaching the closed end position.

The drawer sidewall 7 is configured as a hollow-chamber profile having an inner profiled wall 7a and an outer profiled wall 7b. The drawer sidewall 7 has a channel 17 configured so as to be open to the bottom and extending in a longitudinal direction of the drawer sidewall 17, and the third guide rail 11 of the drawer pull-out guide 4 can be arranged in the channel 17. The drawer sidewall 7 further includes a first fastening device 15a configured to be connected to the rear wall 8, a second fastening device 15b configured to be connected to the front panel 5, and a support portion 16 for supporting the drawer bottom 6.

FIG. 3 shows the first guide rail 9 with the fastening sections 12a, 12b to be fixed to the furniture carcass 2. The first guide rail 9, in a cross-section, includes a U-shaped or a C-shaped section, in which a running carriage 22 and further running carriage 23 separate from the running carriage 22, for guiding and supporting the second guide rail 10, are displaceably supported. The running carriage 22 includes load-transmitting rolling bodies 24, 25, 26, and the rotational axes of which are spaced from one another in a height direction. Accordingly, the rotational axes of the rolling bodies 24, 25, 26 are arranged in running planes A, B, C (see FIG. 5a, FIG. 5b) separate from one another. The running carriage 22 further includes lateral supporting rollers 27, the supporting rollers 27 having rotational axes extending vertically in the mounted position. The lateral supporting rollers 27, on the one hand, are configured to run along a vertical limb of the first guide rail 9, the vertical limb extending in the longitudinal direction (L). On the other hand, the supporting rollers 27 are configured to run along a vertically extending limb 10c (see FIG. 5a, FIG. 5b) of the second guide rail 10. By a tooth arrangement 28 arranged or formed on the running carriage 22, a movement of the running carriage 22 can be synchronized, via a pinion, with a movement of a further running carriage which is displaceably supported between the second guide rail 10 and the third guide rail 11.

Figure 4A:
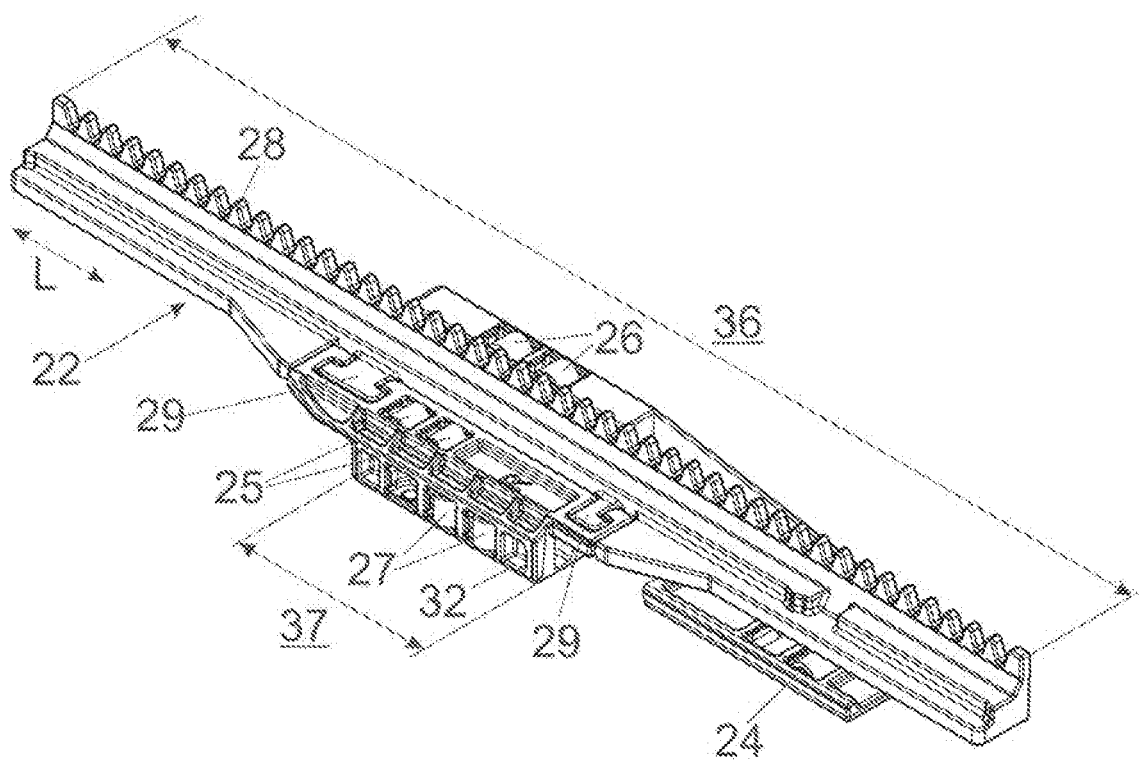
FIG. 4*a*, 4*b* are perspective views of a running carriage having a tooth arrangement and a cage of the running carriage.

FIG. 4a shows the running carriage 22 in a perspective view. The running carriage 22 includes a cage 32 in which the rolling bodies 24, 25, 26 and the lateral supporting rollers 27, 31 are arranged so as to be stationary relative to the cage 32 in a direction extending in a longitudinal direction (L) of the running carriage 22. The tooth arrangement 28, together with the cage 32, can have a one-piece configuration, or—as shown in the figure—can be releasably fixed to the cage 32. For this purpose, the tooth arrangement 28 has tabs 29 spaced from each other in the longitudinal direction (L), and the tabs 29 engage, in the mounted position of the tooth arrangement 28, into corresponding recesses 30 (see FIG. 4b) of the cage 32 in a form-locking manner. Each of the rolling bodies 24, 25, 26 arranged in different running planes A, B, C is rotationally supported about a horizontally extending axis.

Figure 4B:
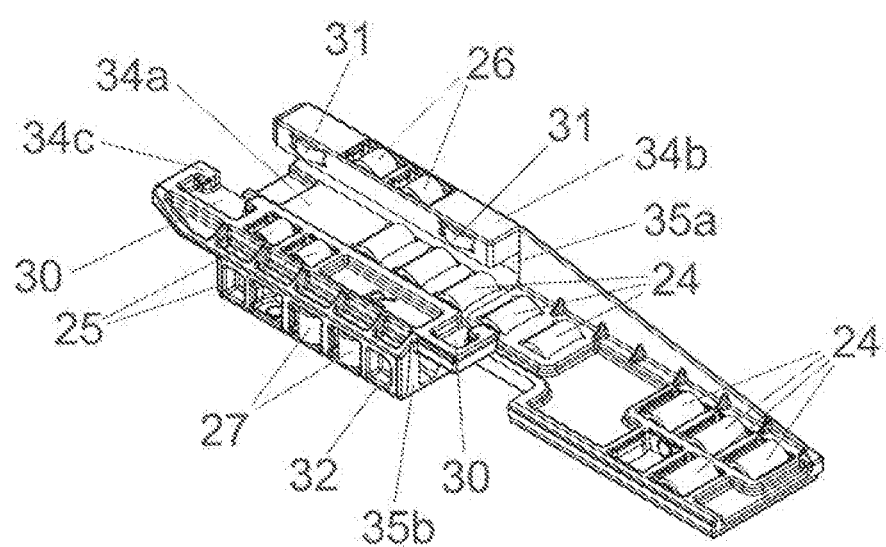

FIG. 4b shows the cage 32 of the running carriage 22, in which the recesses 30 for releasably receiving the tabs 29 of the tooth arrangement 28 are clearly visible. The first rolling bodies 24 are arranged in a first running plane A, the second rolling bodies 25 are arranged in a second running plane B, and the third rolling bodies 26 are arranged in a third running plane C. The first running plane A, the second running plane B and the third running plane C are spaced from one another in a height direction in the mounted position of the drawer pull-out guide 4 on the furniture carcass 2. The rolling bodies 24, 25, 26 can be arranged so as to be spaced from one another in a direction extending in the longitudinal direction (L). All rolling bodies 24, 25, 26 have a cylindrical shape. Moreover, it is also possible that each of the rolling bodies 24, 25, 26 has a different diameter. Thereby, it can be provided that the rolling bodies 24 of the at least three rolling bodies 24, 25, 26, which are supported on a front-end of the running carriage 22, have a diameter being less than a diameter of the other rolling bodies 25, 26.

According to an embodiment, it can be provided that the at least one running carriage 22 includes three limbs 34a, 34b, 34c aligned substantially horizontally in the mounted position, and at least one of the at least three rolling bodies 24, 25, 26 is supported on each of the limbs 34a, 34b, 34c. Preferably, it can be provided that the rolling bodies 24, 25, 26 are passed through the limbs 34a, 34b, 34c. In the shown figure, the limbs 34a, 34b, 34c are connected to one another by two connecting limbs 35a, 35b aligned substantially vertically in the mounted position. It is preferably provided that at least one of the connecting limbs 35a, 35b includes at least one lateral supporting roller 31. Preferably, the supporting roller 31 is passed through the connecting limb 35a, 35b.

One of the limbs 34a, 34b, 34c extending substantially horizontally in the mounted position can extend substantially over an entire width of at least one of the guide rails 9, 10. It is preferably provided that the limb 34a adopts a lowest position relative to the two other limbs 34b, 34c. One of the limbs 34a, 34b, 34c extending substantially horizontally in the mounted position can have a width being substantially double than a width of at least one of the other two limbs 34b, 34c.

The at least one running carriage 22, in a cross-section, can have a substantially U-shaped or a substantially C-shaped configuration.

As can be seen from FIG. 4a, the at least one running carriage 22 can have a length 36, and the region 37 in which the at least three superimposed rolling bodies 24, 25, 26 are arranged, extends over only a part of a length 36 of the at least one running carriage 22.

Figure 5A:
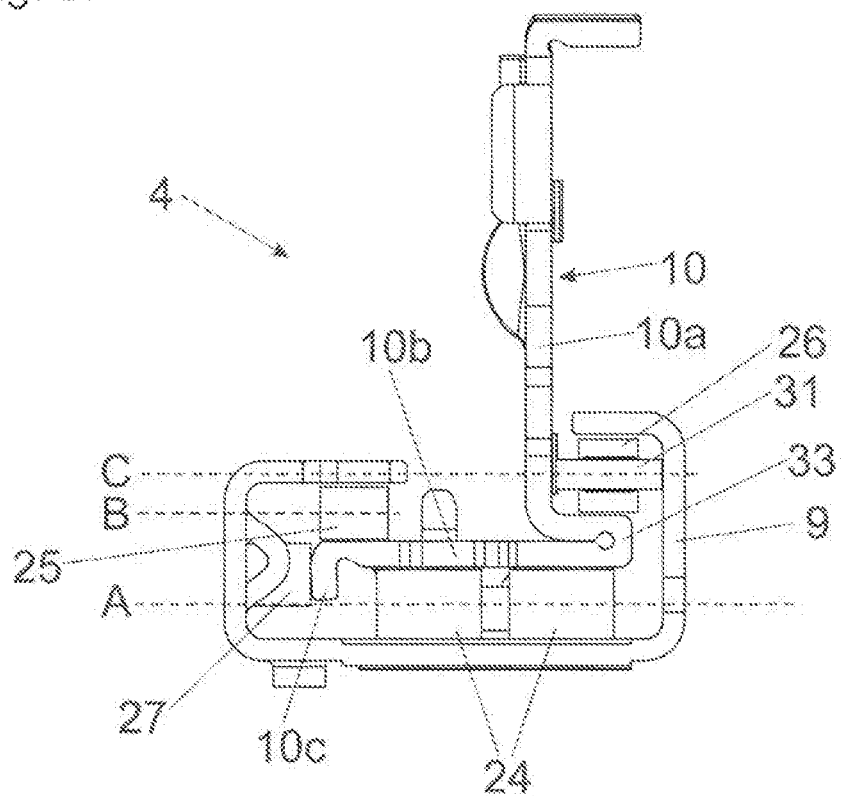
FIG. 5*a*, 5*b* are cross-sectional views of the guide rails with the rolling bodies in two different embodiments.

FIG. 5a shows the first guide rail 9 and the second guide rail 10 of the drawer pull-out guide 4 in a cross-sectional view, the second guide rail 10 being displaceable relative to the first guide rail 9. The cage 32 of the running carriage 22 is hidden for the sake of improved overview. The second guide rail 10 includes a, preferably vertical, side limb 10a and a, preferably horizontal, transverse limb 10b, the transverse limb 10b being connected to the side limb 10b via a rabbet 33. The first rolling bodies 24 are configured to run along a running limb of the first guide rail 9 in the longitudinal direction (L). The second rolling bodies 25 are configured to roll along the transverse limb 10b, and the third rolling bodies 26 are configured to roll along the rabbet 33 of the second guide rail 10. In the shown embodiment, at least one first rolling body 24 and at least one third rolling body 26 are configured to run along the rabbet 33 in running planes A, C separate from one another. Visible is a lateral supporting roller 31 of the running carriage 22, the lateral supporting roller 31 having a vertically extending rotational axis and being configured to run between the first guide rail 9 and the vertically extending side limb 10a of the second guide rail 10. Each of the rolling bodies 24, 25, 26 is rotationally supported about a horizontally extending axis in the mounted position, and each of the axes of the rolling bodies 24, 25, 26 are arranged in three running planes A, B, C lying above one another.

An improved support for compensating for lateral tilting moments is then provided, if the rolling bodies 24, 25, 26—in a view onto a plane extending perpendicular to the longitudinal direction (L) of the guide rails 9, 10 (thus in a view onto a plane orthogonal to the longitudinal direction (L)—are arranged so as to be laterally offset to one another. Moreover, it can be provided that the first rolling body 24 of the at least three rolling bodies 24, 25, 26—in a view onto a plane extending perpendicular to the longitudinal direction (L) of the guide rails 9, 10—adopts a lowest position relative to a second rolling body 25 and to a third rolling body 26, and the second rolling body 25 and the third rolling body 26 are entirely arranged above the first rolling body 24. In the Figure, it is moreover shown that at least two rolling bodies 25, 26 of the at least three rolling bodies 24, 25, 26—in a view onto a plane extending perpendicular to the longitudinal direction (L) of the guide rails 9, 10—are only partially arranged above one another. The transverse limb 10b of the second guide rail 10 is connected to a vertically extending limb 10c, and the lateral supporting rollers 27 having vertical rotational axes are configured to run between the first guide rail 9 and the vertically extending limb 10c of the second guide rail 10.

Figure 5B:
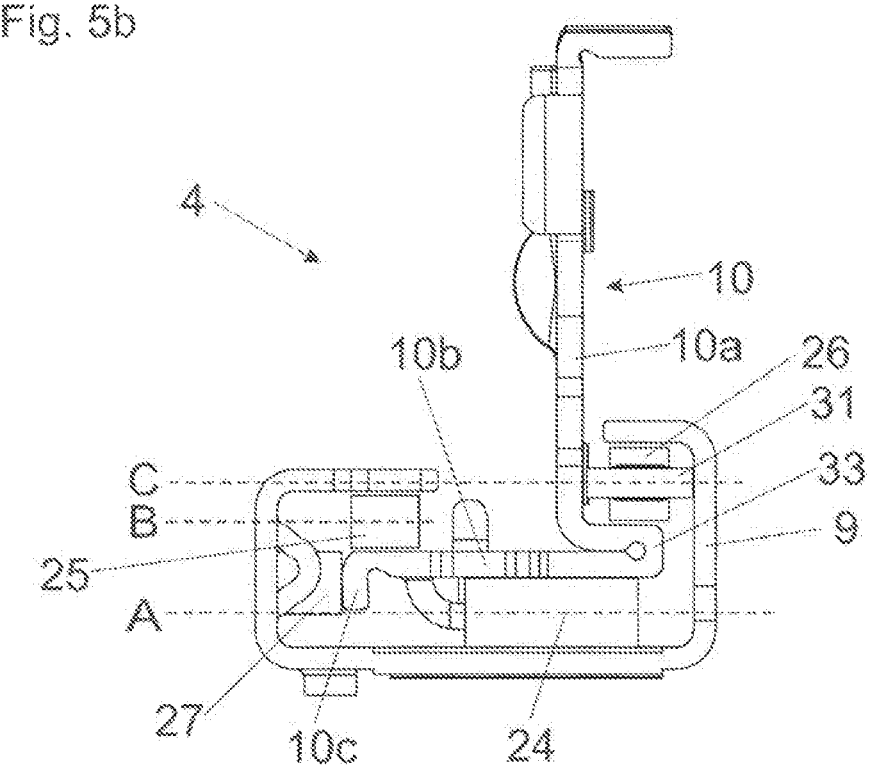

FIG. 5b shows a cross-sectional view of the guide rails 9, 10 with a slightly modified arrangement of the rolling bodies 24, 25, 26. Instead of the rolling bodies 24 according to FIG. 5a, in which the rolling bodies 24 are arranged in laterally spaced manner from one another in the common running plane A, a single rolling body 24 having a larger width is provided in FIG. 5b.

With all embodiments, it can be provided that a first rolling body 24 of the at least three rolling bodies 24, 25, 26 belongs to a first group of rolling bodies, a second rolling body 25 of the at least three rolling bodies 24, 25, 26 belongs to a second group of rolling bodies, and a third rolling body 26 of the at least three rolling bodies 24, 25, 26 belongs to a third group of rolling bodies. Each of the first, second and third group of rolling bodies can include a plurality of rolling bodies 24, 25, 26 which are arranged in a same running plane A, B, C. Moreover, it can be provided that the plurality of rolling bodies 24, 25, 26, which are arranged in a same running plane A, B, C, are spaced from one another in a longitudinal direction (L) of the running carriage 22 and/or are arranged so as to be laterally offset to one another.

The invention claimed is:

1. A drawer pull-out guide, comprising:
   a first guide rail and at least one second guide rail displaceably supported relative to one another;
   a third guide rail to be fixed to a drawer; and
   at least one running carriage displaceably arranged between the first guide rail and the at least one second guide rail,
   wherein:
   the at least one running carriage includes: (i) at least four rolling bodies configured to transmit one or more loads; and (ii) at least one lateral supporting roller;
   each of the at least four rolling bodies has a cylindrical form and is rotatable about a horizontally extending axis in a mounted position of the drawer pull-out guide;
   the at least four rolling bodies, in the mounted position of the drawer pull-out guide, are arranged in at least three running planes lying above one another;
   in a lowest running plane of the at least three running planes, at least two of the at least four rolling bodies are arranged laterally next to one another in a direction extending transverse to a longitudinal direction of the first guide rail and the at least one second guide rail;
   the at least one second guide rail includes a vertically extending limb;
   the at least one lateral supporting roller of the at least one running carriage is in contact with the vertically extending limb of the at least one second guide rail such that the at least one lateral supporting roller of the at least one running carriage is displaceable along the vertically extending limb of the at least one second guide rail;
   the at least one lateral supporting roller of the at least one running carriage has a rotational axis extending vertically in the mounted position of the drawer pull-out guide;
   the first guide rail is to be fixed to a furniture carcass; and
   the at least one second guide rail is displaceably supported between the first guide rail and the third guide rail.

2. The drawer pull-out guide according to claim 1, wherein the at least four rolling bodies in a view onto a plane extending perpendicular to the longitudinal direction of the first guide rail and the at least one second guide rail are arranged so as to be laterally offset to one another.

3. The drawer pull-out guide according to claim 1, wherein a first rolling body of the at least four rolling bodies—in a view onto a plane extending perpendicular to the longitudinal direction of the first guide rail and the at least one second guide rail is at a lowest position relative to a second rolling body of the at least four rolling bodies and to a third rolling body of the at least four rolling bodies, and the second rolling body and the third rolling body are arranged entirely above the first rolling body.

4. The drawer pull-out guide according to claim 1, wherein at least two of the at least four rolling bodies—in a view onto a plane extending perpendicular to the longitudinal direction of the first guide rail and the at least one second guide rail—are arranged only partially above one another.

5. The drawer pull-out guide according to claim 1, wherein the at least four rolling bodies are spaced from each other along a direction extending in the longitudinal direction of the first guide rail and the at least one second guide rail.

6. The drawer pull-out guide according to claim 1, wherein each of the at least four rolling bodies—in relation to the at least one running carriage—is arranged so as to be stationary in a longitudinal direction of the at least one running carriage.

7. The drawer pull-out guide according to claim 1, wherein axes of the at least four rolling bodies are each arranged in the at least three running planes.

8. The drawer pull-out guide according to claim 1, wherein each of at least two of the at least four rolling bodies has a different diameter.

9. The drawer pull-out guide according to claim 8, wherein one rolling body of the at least four rolling bodies, that is arranged on a front end of the at least one running carriage, has a diameter which is less than a diameter of the other rolling bodies of the at least four rolling bodies.

10. The drawer pull-out guide according to claim 1, wherein a first rolling body of the at least four rolling bodies belongs to a first group of rolling bodies, a second rolling body of the at least four rolling bodies belongs to a second group of rolling bodies, and a third rolling body of the at least four rolling bodies belongs to a third group of rolling bodies, wherein each of the first group of rolling bodies, the second group of rolling bodies and the third group of rolling bodies has a plurality of rolling bodies arranged in a same running plane of the at least three running planes.

11. The drawer pull-out guide according to claim 1, wherein:
the first guide rail or the at least one second guide rail has a side limb and a transverse limb connected to the side limb via a rabbet; and
at least one of the at least four rolling bodies is configured to run along the transverse limb and at least another of the at least four rolling bodies is configured to run along the rabbet.

12. The drawer pull-out guide according to claim 1, wherein the at least one running carriage has three limbs aligned substantially horizontally in the mounted position of the drawer pull-out guide, and at least one of the at least four rolling bodies is supported on each of the three limbs.

13. The drawer pull-out guide according to claim 12, wherein the three limbs are connected to one another by two connecting limbs aligned substantially vertically in the mounted position of the drawer pull-out guide.

14. The drawer pull-out guide according to claim 12, wherein one of the three limbs aligned substantially horizontally in the mounted position of the drawer pull-out guide extends substantially over an entire width of at least one of the first guide rail or the at least one second guide rail.

15. The drawer pull-out guide according to claim 12, wherein one of the three limbs aligned substantially horizontally in the mounted position of the drawer pull-out guide has a width which is substantially twice as wide as another of the three limbs.

16. The drawer pull-out guide according to claim 1, wherein the at least one running carriage, in a cross section, has a substantially U-shaped or a substantially C-shaped configuration.

17. The drawer pull-out guide according to claim 1, wherein the at least one running carriage has a length, and a region in which the at least four rolling bodies are arranged, extends over only a part of the length of the at least one running carriage.

18. A drawer comprising at least one drawer pull-out guide according to claim 1 for moving the drawer relative to a furniture carcass.

* * * * *